US011188356B2

(12) United States Patent
Kohler et al.

(10) Patent No.: US 11,188,356 B2
(45) Date of Patent: Nov. 30, 2021

(54) METHOD AND ARRANGEMENT TO ACCESS A FIRST COMPUTER ON A VIRTUAL MACHINE OF A SECOND COMPUTER

(71) Applicant: Siemens Aktiengesellschaft, Munich (DE)

(72) Inventors: Felix Kohler, Oetigheim (DE); Tobias Gaugler, Karlsruhe (DE); Wolfgang Fueßlein, Essingen (DE)

(73) Assignee: Siemens Aktiengesellschaft, Munich (DE)

( * ) Notice: Subject to any disclaimer, the term of this patent is extended or adjusted under 35 U.S.C. 154(b) by 283 days.

(21) Appl. No.: 16/011,895

(22) Filed: Jun. 19, 2018

(65) Prior Publication Data

US 2018/0365039 A1 Dec. 20, 2018

(30) Foreign Application Priority Data

Jun. 20, 2017 (EP) ..................................... 17176913

(51) Int. Cl.
*G06F 9/451* (2018.01)
*H04L 29/06* (2006.01)
(Continued)

(52) U.S. Cl.
CPC .......... *G06F 9/452* (2018.02); *G05B 19/4185* (2013.01); *G06F 8/61* (2013.01);
(Continued)

(58) Field of Classification Search
CPC .......... G06F 9/452; G06F 21/105; G06F 8/61; G06F 9/45558; G06F 2009/45595;
(Continued)

(56) References Cited

U.S. PATENT DOCUMENTS

2003/0033414 A1 2/2003 Bruegger et al.
2007/0174429 A1 7/2007 Robinson et al.
(Continued)

FOREIGN PATENT DOCUMENTS

CN 101410803 4/2009
CN 102571895 7/2012
(Continued)

OTHER PUBLICATIONS

Microsoft Corp., "Remote Desktop Services virtual channels (Windows)", Abstract: Teil 11 in this section 11.2, paragraph ; 2016.
Office Action dated Oct. 9, 2021 issued in Chinese Patent Application No. 201810611076.6.

*Primary Examiner* — Austin J Moreau
(74) *Attorney, Agent, or Firm* — Cozen O'Connor

(57) ABSTRACT

A method and arrangement for providing access of a first computer to at least one application installed on a virtual machine of a second computer via a network connection, wherein at a first step, a Remote Desktop Protocol connection (RDP-C) is established from the first computer to the virtual machine and, at a second step, at least one communication relation of the first computer to an industrial controller is made available to the at least one application as a local communication relation of the application from the virtual machine to the first computer via a virtual channel of the RDP-C connection such that from a user's perspective, only exactly one connection to the virtual machine must be established via the RDP-C, where required back channels can be automatically established and where no security settings must be changed in firewalls or routers.

9 Claims, 3 Drawing Sheets

(51) Int. Cl.
*G06F 21/10* (2013.01)
*G06F 8/61* (2018.01)
*G06F 9/455* (2018.01)
*G05B 19/418* (2006.01)

(52) U.S. Cl.
CPC ........ *G06F 9/45558* (2013.01); *G06F 21/105* (2013.01); *H04L 63/029* (2013.01); *H04L 67/42* (2013.01); *G05B 2219/31156* (2013.01); *G05B 2219/31198* (2013.01); *G05B 2219/31246* (2013.01); *G05B 2219/31457* (2013.01); *G05B 2219/33284* (2013.01); *G06F 2009/45595* (2013.01)

(58) Field of Classification Search
CPC ...... G05B 19/4185; G05B 2219/31198; G05B 2219/31457; G05B 2219/31156; G05B 2219/33284; G05B 2219/31246; H04L 63/029; H04L 67/42; Y02P 90/02
See application file for complete search history.

(56) References Cited

U.S. PATENT DOCUMENTS

| | | | | |
|---|---|---|---|---|
| 2014/0053275 | A1* | 2/2014 | Bauer | H04L 67/06 726/26 |
| 2014/0372508 | A1* | 12/2014 | Fausak | H04L 63/0272 709/203 |
| 2015/0032248 | A1* | 1/2015 | Bauer | G06F 9/45533 700/159 |
| 2017/0127067 | A1* | 5/2017 | Bingol | H04N 19/186 |

FOREIGN PATENT DOCUMENTS

| | | |
|---|---|---|
| CN | 104113542 | 10/2014 |
| CN | 105426230 | 3/2016 |
| CN | 105487916 | 4/2016 |
| DE | 102012205907 | 10/2013 |
| EP | 1283632 | 2/2003 |
| EP | 2801941 | 11/2014 |

* cited by examiner

METHOD AND ARRANGEMENT TO ACCESS A FIRST COMPUTER ON A VIRTUAL MACHINE OF A SECOND COMPUTER

BACKGROUND OF THE INVENTION

1. Field of the Invention

The invention relates to a method to access a first computer on at least one application installed on a virtual machine of a second computer, and to an arrangement with a first computer and a second computer with a virtual machine.

2. Description of the Related Art

In industrial automation arrangements, normally, programmable logic controllers (PLCs) or operating and monitoring equipment (Human Machine Interface (HMI)) are operated, which must be programmed for their use with software. So-called programming devices are used in the automation networks for programming these devices and for their maintenance, which are, for example, composed of a personal computer with related control software. These are connected to the programmable logic controllers, operating and monitoring equipment and other active automation components via a proprietary network connection, i.e., the automation network.

The software required for operation of the programmable logic controllers and the operating and monitoring equipment is created using an engineering system and loaded directly onto the target hardware there from or via the aforementioned programming device. Often, the engineering system is classically installed on the programming device or, however, connected to the programming device, in particular via a network connection.

The geographical or spatial proximity required for such a configuration between the programming device and the engineering system is often not available, in particular, in the case of larger automation arrangements or being spread across different locations. In particular, it is often required that the programming device and the engineering system communicate with each other via a wide area network, i.e., an intranet or the Internet. This can particularly be the case when the engineering service or parts of it, for example, compiling, are provided as a service within a public network; in this connection, one also refers to a "cloud". In the case of such configurations, the engineering system is often not directly installed on a computer, but within a virtual machine, which brings along important advantages in the provision and scaling of a service.

The disadvantage of the described distribution of the systems and the necessity of communicating via a wide area network associated therewith, in particular, the Internet, is the fact that a plurality of individual connections must be established between the programming device and the virtual machine with the engineering system. Among other things, the reason for this entails that the conventional engineering systems are set up to access the programmable logic controllers or the operating and monitoring equipment directly via a local interface of the computer, upon which they are being run. If a user, who uses a local programming device, would like to access the functions of the engineering system, not only must a remote-controlled session be created to use the remotely installed engineering system, but furthermore, connections must be provided for the engineering system to be able to simultaneously exchange data with the programmable logic controllers or the operating and monitoring equipment.

During the pure use of the remotely installed engineering system via a common "remotely controlled protocol", in particular, via the Remote Desktop Protocol (RDP) by the company Microsoft, it is necessary for the simultaneously required access of the engineering system using the target hardware to establish further communication channels via the wide area network (Internet). In addition, it is common to install control software onto the computer with the virtual machine and the engineering system running on it, as well as on the computer with the programming device, respectively, where the control software manages corresponding channels and exchanges the corresponding information via the wide area network. In line with the described availability of the services within the network ("cloud"), this additional software is also referred to as a "cloud connector".

In brief, when using virtual machines in a private network environment ("cloud") in connection with real automation hardware, which is connected to an operating station (programming device, personal computer), a user must establish a plurality of various types of connections between the "real" personal computer (programming device) and the virtual machine (engineering system) manually. Generally, this is a very complex process because the usual security mechanisms of the network technology used in the process, in particular of routers and other active network components, are generally configured such that these connections cannot be established or the activations corresponding to the establishment of the connections within the security technology must be configured, in particular within "firewalls". In particular, in the case of using public networks, such as the Internet, it is almost impossible to activate the correspondingly required virtual channels ("ports") on a continual basis.

SUMMARY OF THE INVENTION

In view of the foregoing, it is therefore an object of the present invention to ensure also ensure a required multi-channel communication between the virtual machine and the programming device in networks with strict security requirements.

This and other objects and advantages are achieved in accordance with the invention by a method and arrangement that make use of the fact that the aforementioned Remote Desktop Protocol uses only a few ports which have generally already been activated in any case for the remote control of computers via a network. In accordance with the invention, a virtual channel of the Remote Desktop connection is used to provide the communication relations of the hardware interfaces of the programming device via the network connection of the virtual machine to the engineering system in the same way as if the mentioned communication relations and channels were local relationships of the virtual machine. While traditionally the Remote Desktop Protocol can only make available hardware-supported services, such as a keyboard service, a mouse service, a printer service and direct hardware interfaces, such as, for example, USB ports to the RDP server, meaning the remotely controlled computer, and cannot offer any access to the related preconfigured communication services of the client computer, in accordance with the invention, a direct, secure access to the peripherals connected to the programming device and therefore also access to the programmable logic controllers to be programmed and the operating and monitoring equipment is available via "tunneling" of the special communication relations between the virtual machine and the engineering system. With the information of the communication relations being completely transmitted within the Remote Desktop connection within a virtual channel, no other ports must be activated within firewalls. Instead, it is enough that the Remote Desktop connection can be established, which is practically always capable of functioning. The interface, via which communication is made with the PLC, is thus not simply displayed within the virtual machine with the engineering system or mapped into the virtual machine. Rather, each communication that is possible via this interface is made possible via this interface within the virtual machine, such as PROFIBUS or DCP. That is, a difference, for example, from a USB interface mapped into the virtual machine via RDP, via which USB interface USB ethernet adapters or PROFIBUS adapters could also be mapped, for example. The special information and configurations for using the interface therefore remain on the part of the programming device, to which the PLC is connected. Furthermore, the hardware interfaces subordinate to the communication relations are not generally visible within the virtual machine due to this process (e.g., in a device manager of the operating system), but can be exclusively used by the engineering software.

As such, a method for a first computer to access at least one application installed on a virtual machine of a second computer via a network connection is provided, where a programming device of an industrial automation arrangement is used as the first computer, where the programming device is connected to at least one industrial controller via an automation network, where, via the programming device (PG) and via an interface connection, the at least one application accesses the at least one industrial controller, and where a Remote Desktop Protocol connection is established at a first step from the first computer to the virtual machine. At a second step, the interface connection is established from the virtual machine to the first computer via a virtual channel of the Remote Desktop Protocol connection, where at least one communication relation of the first computer to the at least one industrial controller is made available to the at least one application via the interface connection as a local communication relation of the application. With this, from the view of the user, exactly one connection to the virtual machine must be established only via the Remote Desktop Protocol, where the required back channels can be automatically established and where no security settings must be changed in firewalls or routers.

It is also an object of the invention to provide an arrangement, in which the described method is used. Here, an arrangement with a first computer and a second computer with a virtual machine is provided, where at least one application is installed on the virtual machine, where the first computer is a programming device of an industrial automation arrangement, where the programming device is connected to at least one industrial controller via an automation network, where the at least one application accesses the at least one industrial controller by means of the programming device and via an interface connection, and wherein an access of the first computer to the at least one application is provided via a network connection, where, at a first step, a Remote Desktop Protocol connection is established from the first computer to the virtual machine. Moreover, at a second step, at least one communication relation of the first computer to the industrial controller is made available to the at least one application from the virtual machine to the first computer via a virtual channel of the Remote Desktop Protocol connection as a local communication relation. With such an arrangement, the advantages that have already been discussed based on the method can be achieved.

Preferably, before the first step, a software to manage the information of the interface connection to be transmitted via the virtual channel is installed on the first computer and on the virtual machine, respectively. As a result, it is possible to automatically establish the interface connection via the virtual channel after initiating the Remote Desktop Protocol connection without a user having to manually configure this. Consequently, the at least one communication relation to the at least one industrial control system is detected by the software ("cloud connector") installed on the first computer and made accessible via the virtual channel (RDP-VC) of the software installed on the second computer, and the software installed on the second computer makes this at least one communication relation of the application accessible. Preferably, the software ("cloud connector") installed on the first and the second computer is advantageously identical and can act as a server or as a client according to the configuration. However, various versions of the software for the first and for the second computer are also possible. In a preferred embodiment, the first and the second computer respectively have an operating system each with an operating system extension (e.g., "S7DOS" by Siemens AG), where the software installed on the first computer is connected to the operating system extension of the first computer and the software installed on the second computer is connected to the operating system extension of the second computer.

Preferably, the virtual channel or another virtual channel of the Remote Desktop connection is used for the access of the at least one application to a server service of the first computer or another computer. Such a server service can, in particular, preferably a service to provide licenses, in particular for licenses to use the at least one application. Furthermore, connections to other servers, in particular to alarm servers, can also be established via the virtual channel or other virtual channels of the Remote Desktop connection, which can then be used like a server or a service of the application, which is made locally available.

Preferably, an engineering system for industrial automation arrangements is used as the at least one application, in particular a portal application to access a plurality of engineering services (e.g. "TIA Portal" by Siemens AG).

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the method according to the invention is explained below based on the drawing. It simultaneously serves to explain an arrangement according to the invention, in which.

DETAILED DESCRIPTION OF THE PRESENTLY PREFERRED EMBODIMENTS

Figure 1:
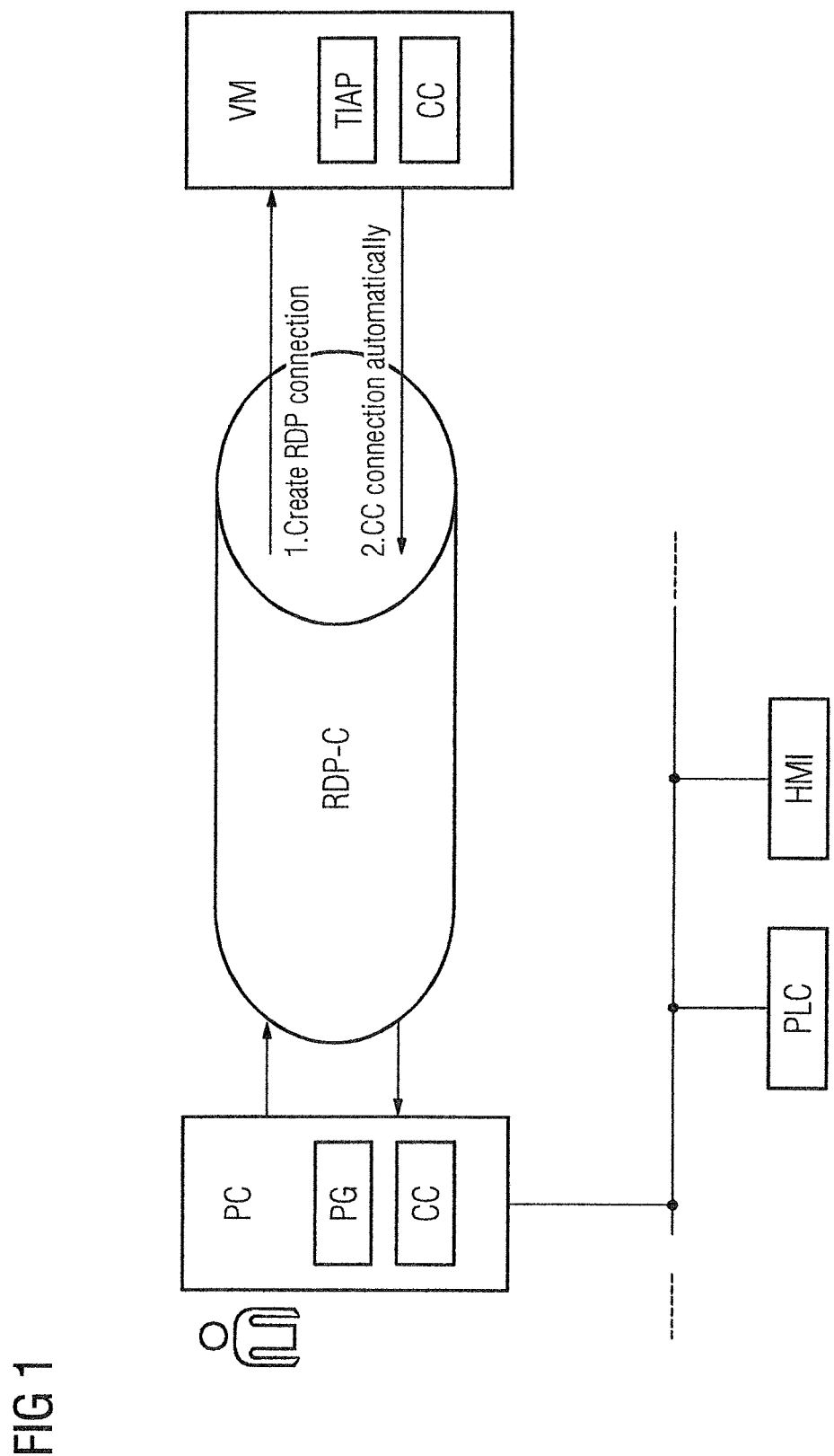
FIG. 1 is a schematic representation of a programming device with a connected programmable logic controller, where the programming device is connected to a virtual machine with an engineering system via a Remote Desktop connection in accordance with the invention.

In FIG. 1, a personal computer PC is schematically shown, which is a working station for an operator, where the personal computer PC is configured as a programming device PG for an industrial automation arrangement via a corresponding application. With a local hardware interface, in particular an interface appropriate for automation networks, such as PROFIBUS, PROFINET or industrial Ethernet, the personal computer PC and therefore the programming device PG set up thereby is connected to a programmable logic controller PLC and an operating and monitoring device HMI. These devices are representative for a plurality of various automation components.

The personal computer PC ("first computer") is furthermore advantageously connected, via another hardware interface, such as an Ethernet interface or a WLAN interface, to another network, such as an intranet or the Internet. In principle, the personal computer PC and, thereby, the programming device PG can exchange data with another, second computer via this network connection, where this other, second computer has a virtual machine VM, where an engineering software TIAP (e.g., "TIA Portal" by Siemens AG) runs/executes on the virtual machine VM as an application. The engineering software TIAP (also referred to as "engineering system") thereby serves to plan and, in particular, also to program industrial components, in particular the programmable logic controller PLC and the operating and monitoring equipment HMI.

The engineering software TIAP is not only set up to create the required software for the operation of the programmable logic controller PLC or the operating and monitoring equipment HMI, meaning to operate an editor for the creation of the program and a compiler etc. to generate the executable code, but also in order to transmit the generated executable code and other data to the corresponding target hardware (PLC, HMI) via a local communication relation, which uses, for example, a local hardware interface to the automation network. While the engineering software TIAP was frequently locally installed in the personal computer PC with the direct connection to the target hardware (PLC, HMI) in the past for this reason, it is frequently desired to make the engineering "service" available within a network. The term "cloud engineering" is also used. Thereby, the user uses the personal computer PC with the programming device PG to access the functionality of the engineering software TIAP via a network, such as the Internet. In the case of the presently shown embodiment, it is provided that the engineering software TIAP completely executes in the virtual machine VM and is used via a terminal service from the remote location of the personal computer PC.

For this purpose, a terminal connection is initially established from the personal computer PC to the virtual machine VM, thereby being in the present case a connection RDP-C in accordance with the Remote Desktop Protocol by Microsoft. This is shown in the figures by arrows with the annotation "1. Create RDP connection".

With the RDP-C connection, it is now already possible that the user controls the engineering software TIAP remotely, meaning that several local services of the personal computer PC, such as the keyboard service, the mouse service, the printer service, act on the virtual machine VM via the RDP-C connection and, in turn, screen readouts of the virtual machine VM are output on the personal computer PC.

Another software CC ("cloud connector") is respectively installed on the personal computer PC and on the virtual machine VM, where the software CC has both a server component as well as a client component. Here, as an example it is assumed that the client component is used on the virtual machine VM and the server component of the software CC is used on the personal computer PC. However, it is also possible to deviate from this convention. Thereby, the software CC is respectively connected to an operating system extension (e.g. "S7DOS" of Siemens AG) of each computer. This operating system extension provides the programming device PG of the first computer with the communication relations to the automation devices. For the case that the application should communicate directly with an automation device, for example, with a programmable logic controller PLC, the extension on the second computer is likewise responsible for providing the communication relation via a local hardware interface of the second computer, i.e., neither the application of the second computer nor the programming device, i.e., an application of the first computer, access local hardware interfaces directly, but always via the respective operating system extension. This is in contrast to a direct "mapping" of hardware interfaces into the virtual machine VM, which would then make these interfaces visible to all the applications installed there, which is not desired for security reasons, among other things.

Figure 2:
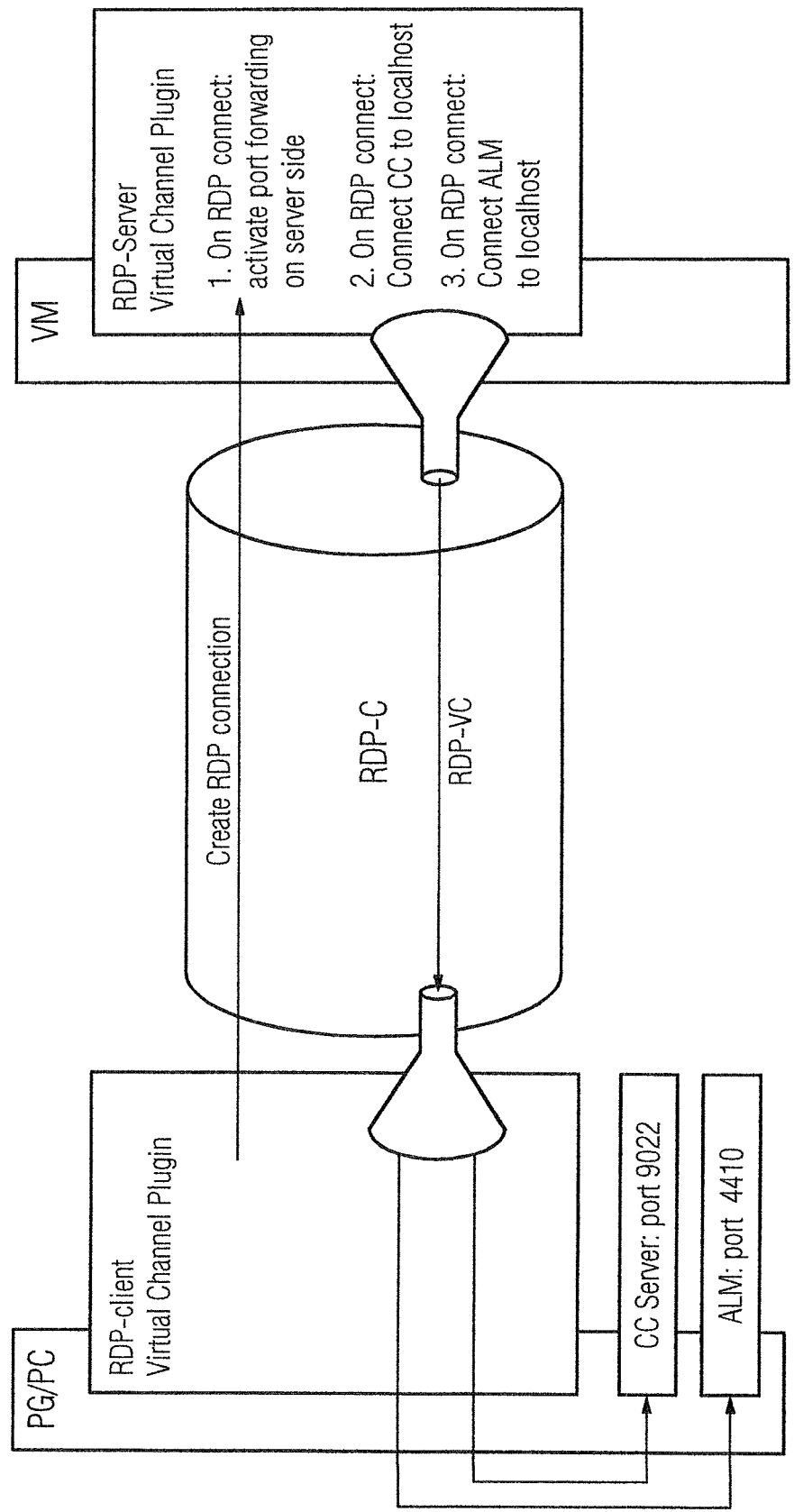
FIG. 2 is a schematic representation of the information flow and construction of the virtual interface connection of the Remote Desktop connection of the arrangement of FIG. 1.

In a next step, the client component of the software CC now establishes another connection ("CC connection") automatically to its counterpart (server component) of the personal computer PC. FIG. 2 shows this process in a detailed view. The software CC uses a virtual channel for the connection ("CC connection"), which further channel is provided by an additional module of the RDP functionality (RDP server, RDP client), i.e., the "virtual channel plug-in". This additional connection is referred to in FIG. 2 with the reference RDP-VC ("Remote Desktop Protocol—Virtual Channel"). The resulting connection is connected to the local host interface on the virtual machine VM and is in the form of a local hardware interface there, in particular, in the form of a local Ethernet interface, of the operating system extension ("S7DOS"), thereby being indirectly available to the engineering software TIAP. This means that the communication relationship of the first computer thus "extended" into the virtual machine of the second computer is not available to all applications of the second computer, but only to the applications set up on the extension ("S7DOS") (here: engineering system TIAP).

The virtual connection RDP-VC is also connected to a local hardware interface via the software CC on the personal computer PC and the programming device PG formed with it, namely to the local extension of the operating system ("S7DOS") and, thereby, indirectly to the connection (hardware interface) to the local automation network, to which the programmable logic controller PLC and the operating and monitoring equipment HMI are connected. With the software CC and its personal computer PC server component, access of the engineering software TIAP to the target hardware to be programmed PLC, HMI is thus possible. Furthermore, it is optionally possible to connect other servers to the engineering software TIAP via the virtual connection RDP-VC, in particular a license server ALM (Automation License Manager).

To operate, a user can configure the software CC on the personal computer PC and thereby the programming device PG formed with it to have to use an RDP connection. In the case of each construction of an RDP connection to the virtual machine VM, a connection between the server component and the client component of the software CC, i.e., a "CC connection", is automatically established back to the personal computer PC or the programming device PG. Optionally, another "tunneled" connection to use a license manager ALM can automatically be established from the virtual machine VM to the programming device PG and a license server ALM installed there. This has the advantage that no licenses have to be installed or made available in the virtual machine VM and makes an automatic configuration of the licenses possible. The virtual connection RDP-VC can also be used for other services such as a time service, file service, etc.

Additional connections can be established within the RDP connection automatically and in a preconfigured manner by using the RDP connections, which are also quite generally functional and activated within public networks, and the virtual RDP channels (via the "virtual channel plug-in"), which are thereby possible and "tunneled" within the connections. Furthermore, no other changes to security settings, particularly opening additional ports in firewalls, are required. From the user perspective, only exactly one connection to the virtual machine VM must be established for a "Remote Desktop Protocol" connection.

Figure 3:
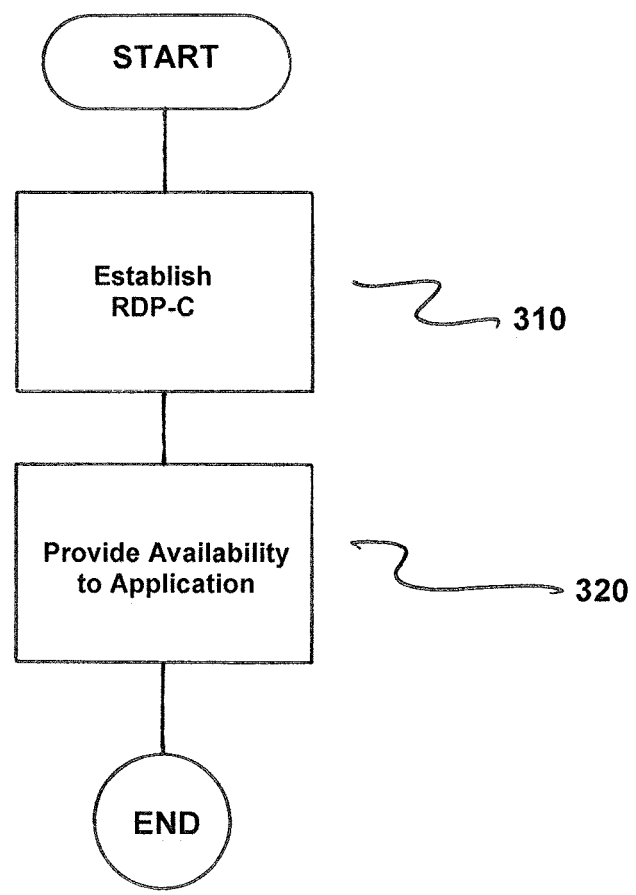
FIG. 3 is a flowchart of the method in accordance with the invention.

FIG. 3 is a flowchart of a method for providing access of a first computer PC to at least one application installed on a virtual machine VM of a second computer via a network connection, where a programming device PG of an industrial automation arrangement is utilized as the first computer PC, the programming device PG is connected to at least one industrial controller PLC via an automation network, and the at least one application accesses the at least one industrial controller PLC via the programming device PG and via an interface connection. The method comprises establishing a Remote Desktop Protocol (RDP) connection (RDP-C) from the first computer PC to the virtual machine VM, as indicated in step 310.

Next, availability of at least one communication relation of the first computer PC to the industrial controller PLC from the virtual machine VM to the first computer PC is provided to the at least one application as a local communication relation via a virtual channel RDP-VC of the Remote Desktop Protocol (RDP) connection (RDP-C), as indicated in step 320.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for providing access of a first computer configured as a programming device to at least one application installed on a virtual machine of a second computer including software having a server component and a client component via a network connection, a programming device of an industrial automation arrangement being utilized as the first computer and including software having a server component and a client component, the first computer configured as the programming device being connected to at least one programmable logic controller (PLC) via an automation network, the at least one application accessing the at least one PLC via the first computer configured as the programming device and via a virtual interface connection, the method comprising:

establishing a Remote Desktop Protocol connection (RDP-C) from the first computer to the virtual machine via the virtual interface connection; and establishing automatically, by the client component of the second computer, a virtual channel to provide availability of at least one communication relation of the first computer with respect to the PLC to the at least one application as a local communication relation, said availability of the at least one communication relation being provided from the virtual machine of the second computer to the first computer via the automatically established virtual channel of the Remote Desktop Protocol connection.

2. The method as claimed in patent claim 1, wherein software is installed on the first computer and on the virtual machine respectively to manage information to be transmitted via the virtual channel of the local communication relation prior to said establishing the Remote Desktop Protocol connection.

3. The method as claimed in patent claim 2, wherein the at least one communication relation to the at least one PLC is detected by the software installed on the first computer and is made accessible via the virtual channel of the software installed on the second computer; and wherein the software installed on the second computer makes this at least one communication relation of the application accessible.

4. The method as claimed in patent claim 3, wherein the first and the second computers respectively have an operating system each with an operating system extension; wherein the software installed on the first computer is connected to the operating system extension of the first computer and the software installed on the second computer is connected to the operating system extension of the second computer.

5. The method as claimed in claim 1, wherein one of (i) the virtual channel and (ii) another virtual channel of the Remote Desktop connection is utilized to access the at least one application to a server service of the first computer.

6. The method as claimed in patent claim 5, wherein a service to provide licenses is used as the server service.

7. The method as claimed in patent claim 6, wherein the provided licenses are licenses to use the at least one application.

8. The method as claimed in claim 7, wherein the at least one application comprises an engineering system for industrial automation.

9. An arrangement comprising:

a first computer configured as a programming device of an industrial automation arrangement and including software having a server component and a client component; and a second computer including software having a server component and a client component and including a virtual machine;

at least one application installed on the virtual machine;

wherein the first computer configured as the programming device is connected to at least one programmable logic controller (PLC) via an automation network;

wherein the at least one application accesses the at least one PLC via the first computer configured as the programming device and via a virtual interface connection;

wherein an access of the first computer configured as the programming device to the at least one application is provided via a network connection; and wherein the arrangement is configured to:

establish a Remote Desktop Protocol connection from the first computer to the virtual machine via the virtual interface connection; and establish automatically, by the client component of the second computer, a virtual channel to provide availability of at least one communication relation of the first computer with respect to the PLC to the at least one application as a local communication relation, said availability of the at least one communication relation being provided from the virtual machine of the second computer to the first computer via the automatically established virtual channel of the Remote Desktop Protocol connection.

* * * * *